United States Patent [19]

Dixon

[11] Patent Number: 5,896,848
[45] Date of Patent: Apr. 27, 1999

[54] IGNITION CONTROL CIRCUIT FOR INTERNAL COMBUSTION ENGINE

[75] Inventor: Stanley John Dixon, London Colney, United Kingdom

[73] Assignee: BG plc, Berkshire, United Kingdom

[21] Appl. No.: 08/860,723

[22] PCT Filed: Nov. 11, 1996

[86] PCT No.: PCT/GB96/02776

§ 371 Date: Dec. 15, 1997

§ 102(e) Date: Dec. 15, 1997

[87] PCT Pub. No.: WO97/18391

PCT Pub. Date: May 22, 1997

[30] Foreign Application Priority Data

Nov. 15, 1995 [GB] United Kingdom ............. 9523432

[51] Int. Cl.$^6$ .......................................... F02P 9/00
[52] U.S. Cl. .................. 123/609; 123/626; 123/630
[58] Field of Search ..................... 123/609, 630, 123/625, 626; 324/395

[56] References Cited

U.S. PATENT DOCUMENTS

| 4,041,912 | 8/1977 | Sessions. | |
|---|---|---|---|
| 4,043,302 | 8/1977 | Sessions. | |
| 4,176,644 | 12/1979 | Hellberg et al.. | |
| 4,231,348 | 11/1980 | Schiele et al.. | |
| 4,380,989 | 4/1983 | Iwao. | |
| 4,399,802 | 8/1983 | Oshiage et al.. | |
| 5,054,461 | 10/1991 | Deutsch et al.. | |
| 5,156,127 | 10/1992 | Ghaem | 123/630 |
| 5,208,541 | 5/1993 | Yerkovich et al.. | |
| 5,343,844 | 9/1994 | Fukui et al. | 123/630 |
| 5,404,860 | 4/1995 | Morino. | |
| 5,438,970 | 8/1995 | Maruyama et al. | 123/630 |
| 5,507,264 | 4/1996 | Kugler et al. | 123/630 |
| 5,571,245 | 11/1996 | Ooyabu et al. | 123/630 |
| 5,701,876 | 12/1997 | Morita et al. | 123/630 |

FOREIGN PATENT DOCUMENTS

| 0 281 528 | 9/1988 | European Pat. Off.. |
|---|---|---|
| 0 502 549 | 9/1992 | European Pat. Off.. |
| 0 555 851 A2 | 2/1993 | European Pat. Off.. |
| 54-014030 | 3/1979 | Japan. |
| 1 601 785 | 5/1978 | United Kingdom. |
| 2 173 601 | 10/1986 | United Kingdom. |
| WO 93 02286 | 2/1993 | WIPO. |

*Primary Examiner*—Erick R. Solis
*Attorney, Agent, or Firm*—Oblon, Spivak, McClelland, Maier & Neustadt, P.C.

[57] ABSTRACT

A combined heat and power system including a 4 cylinder reciprocating internal combustion engine fuelled by a fuel gas, for example natural gas, and operating at a substantially constant speed and at a substantially constant air to fuel ratio. Operation of a spark generator and distributor device (44) is under control of an ignition spark duration control (10) whereby the duration of an ignition spark between the electrodes of the plug (16) is automatically variable to bring the spark duration closer to a predetermined minimum duration over which predetermined minimum duration there would be supplied to the electrodes of the plugs in turn a minimum-level of electrical ignition energy to substantially avoid misfire in the cylinders provided with the plugs. The minimum level of the electrical ignition energy is variable according to the size of the gap between the electrodes of the plug (16). The duration of the ignition spark of the plug (16) is observed by a monitor (62) in the lead which inputs the observed duration time into the control (10).

18 Claims, 5 Drawing Sheets

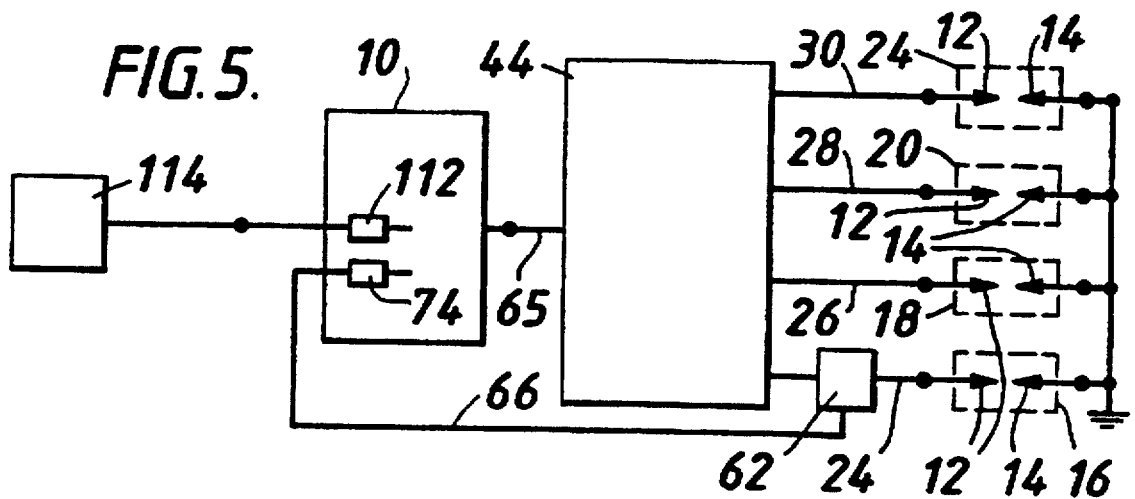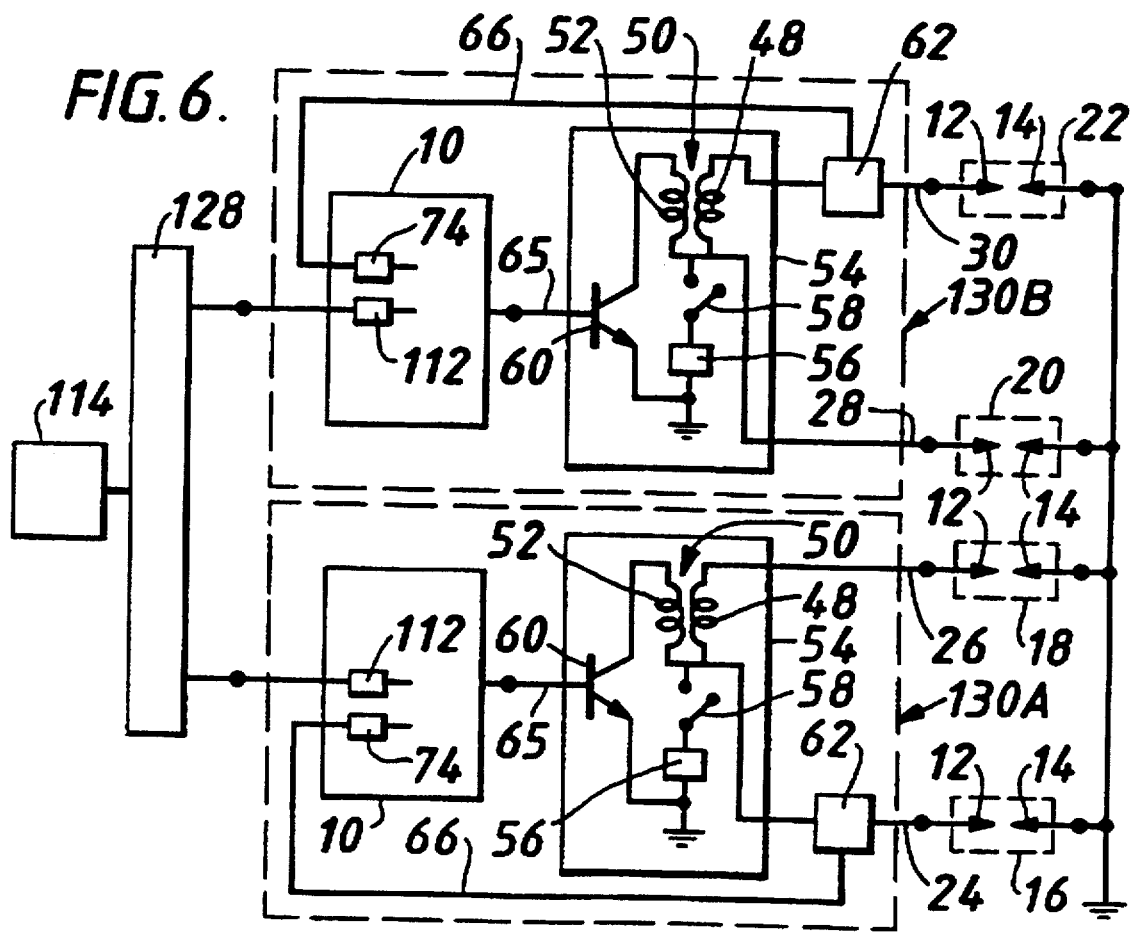

IGNITION CONTROL CIRCUIT FOR INTERNAL COMBUSTION ENGINE

This invention concerns a reciprocating internal combustion engine, and also concerns combined heat and power (CHP) apparatus provided with such an engine.

In such CHP apparatus the engine drives an electrical generator and also produces utilizable heat.

An economic case for using CHP apparatus is considerably dependent on the costs of routine maintenance of the apparatus, such as the cost of servicing the engine. Extending the service intervals of the engine can have a significant effect on the economic case for using CHP.

The spark plugs used in a CHP internal combustion engine need to be checked regularly to ensure that the gap between the plug electrodes does not increase to a size where misfire occurs.

An object of the invention is to provide a reciprocating internal combustion engine so adapted as to alter automatically the electrical ignition energy applied to the electrodes of a spark plug in a cylinder of the engine to substantially a minimum level required to ensure correct combustion of the fuel in the cylinder.

According to the invention a reciprocating internal combustion engine, which operates at a substantially constant speed and at a substantially constant air to fuel ratio, comprises at least one cylinder provided with a spark plug having at least two electrodes with a gap therebetween, and ignition spark duration control means whereby the duration of an ignition spark between said electrodes is automatically variable to bring said spark duration closer to a predetermined minimum duration over which predetermined minimum duration there would be supplied to the electrodes a minimum level of electrical ignition energy to substantially avoid misfire in the cylinder, and said minimum level being variable according to the size of said gap.

Thus there is avoided the need to apply excessive electrical ignition energy to the spark plug electrodes all the time in order to ensure there is enough energy to cause an adequate spark when either or both electrodes is/are worn and the spark gap has increased over the many hours of engine operation after the spark plug was fitted or its electrode gap set. Accordingly the avoidance of the need to continually use excessive electrical ignition energy slows the rate of spark plug electrode wear and slows the rate of increase of electrode gap size, for a given spark plug.

Engine test work has shown that for a given engine operating under constant conditions of speed, fuel to air ratio, (and also load) there is a minimum, fixed spark duration necessary to ensure correct combustion. For a given spark plug electrode gap, the fixed minimum spark duration requires a certain minimum electrical ignition energy to be supplied. An increase in the supplied electrical energy beyond this minimum level will not show any benefits, whereas a reduction will cause misfire. As the spark plug gap increases, then the said minimum energy level required, increases.

The invention will now be further described, by way of example with reference to the accompanying drawings in which:

FIG. 1 is a diagrammatic representation of a combined heat and power (CHP) apparatus comprising a reciprocating, internal combustion engine formed according to the invention;

FIG. 2 diagrammatically shows ignition spark duration control means in combination with an ignition system and spark plugs of the engine in FIG. 1;

FIG. 5 is a diagrammatic representation of the arrangement in FIG. 2, as an aid to understanding FIGS. 5 and 6;

Figure 7:
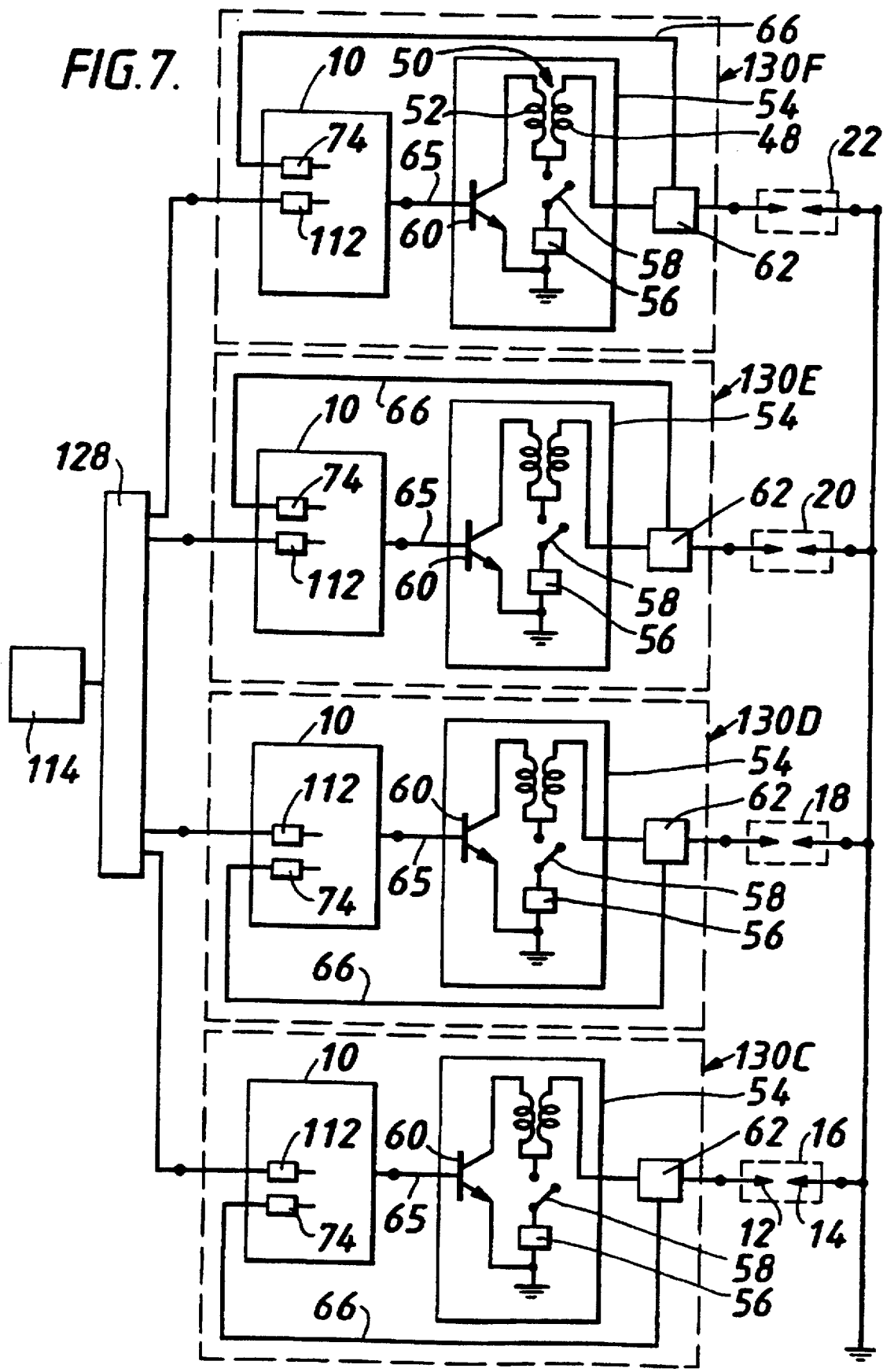

FIG. 6 is a diagrammatic representation of a fragment of a second embodiment of an internal combustion engine formed according to the invention, having an ignition system of the wasted spark type, and FIG. 7 is a diagrammatic representation of a fragment of a third embodiment of an internal combustion engine formed according to the invention in which each spark plug is supplied with electrical ignition energy from a respective ignition coil.

In the following description like references refer to like or similar parts.

Figure 1:
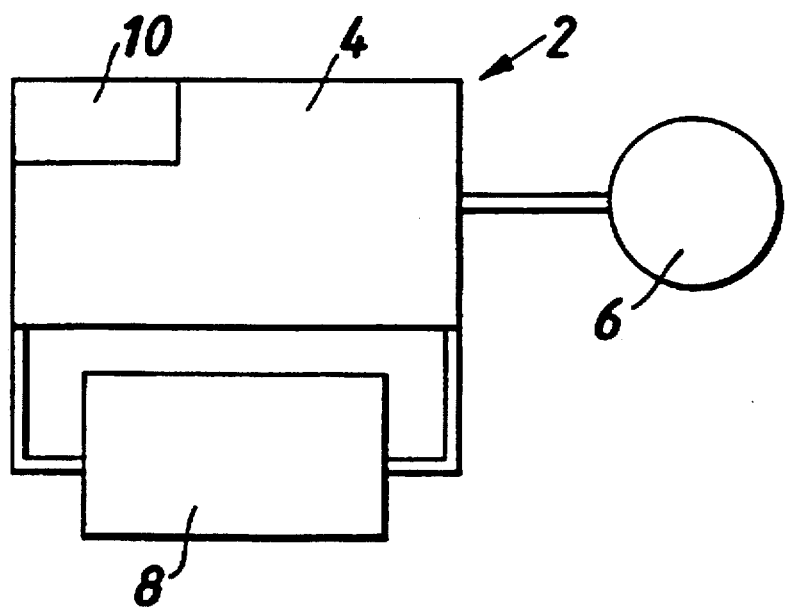

With reference to FIG. 1 a combined heat and power (CHP) apparatus 2 comprises a multi-cylinder, reciprocating internal combustion engine 4 which may be fuelled by fuel gas, for example natural gas, and is arranged to operate at a substantially constant predetermined speed with substantially constant, predetermined air to fuel ratio, and may operate under a substantially constant load. The engine 2 drives an electrical generator 6 and heat from the engine, for example from the engine coolant and/or from the exhaust gases and/or from the lubricating oil, is extracted by a heat exchanger arrangement 8 for the heat to be used for some heating purpose.

The engine 2 is provided with an ignition spark duration control 10 to control the duration of the ignition spark between two electrodes 12 and 14 (see FIGS. 2 and 5) of a respective spark plug 16, 18, 20 or 22 in each of the cylinders of the engine. Preferably the spark plugs are substantially similar in their operating characteristics.

Figure 2:
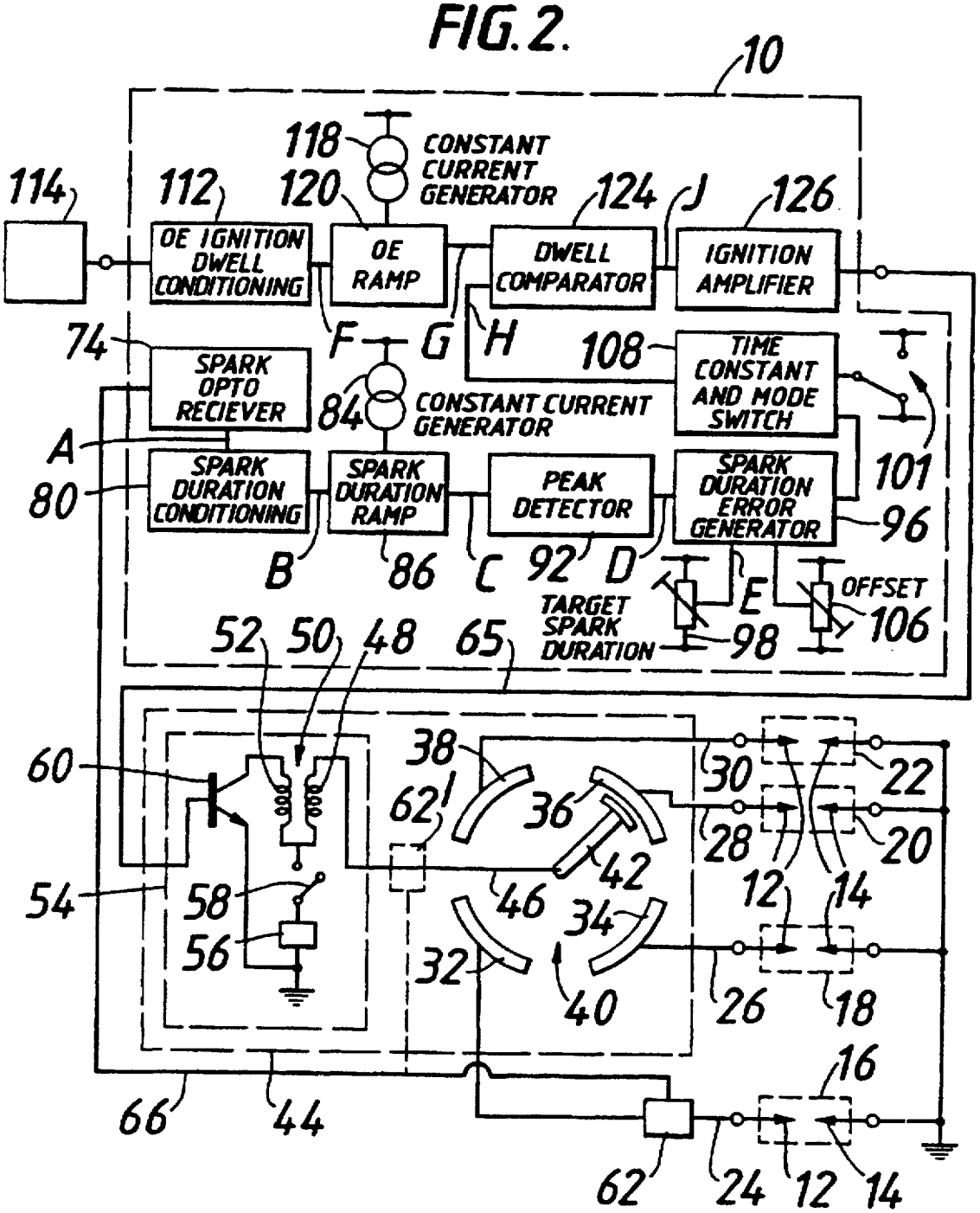

With reference to FIG. 2, the electrode 12 in each spark plug is connected by a respective plug lead 24, 26, 28 or 30 connected to a respective contact 32, 34, 36, 38 in a distributor 40 known per se comprising a rotor arm 42 in a spark generator 44 known per se wherein an high tension or king lead 46 to the rotor arm is from a secondary winding 48 of an ignition coil 50 having a primary winding 52. The ignition coil 50 is part of an ignition coil powering system 54 (known per se) comprising a battery or accumulator 56 of any suitable kind (known per se), often a lead-acid accumulator, an ignition switch 58 (known per se) which is closed when the engine is running and a transistor switch 60 turned on and off by a signal of varying voltage on line 62 from the ignition spark duration control 10.

The invention may be applied to engines of a standard type using a given type of spark plugs so that one engine of that standard type may be used as a typical example to establish an operating characteristic, namely a predetermined minimum ignition spark duration at the plugs. The engine used as the example is operated and the ignition spark duration is made progressively shorter until misfire occurs. Then the spark duration time is increased until misfire just ceases to occur and the duration is then measured. That measured duration is substantially the predetermined minimum duration for the ignition spark the occurrence of which may be said to ensure the correct combustion of the fuel.

Figure 3:
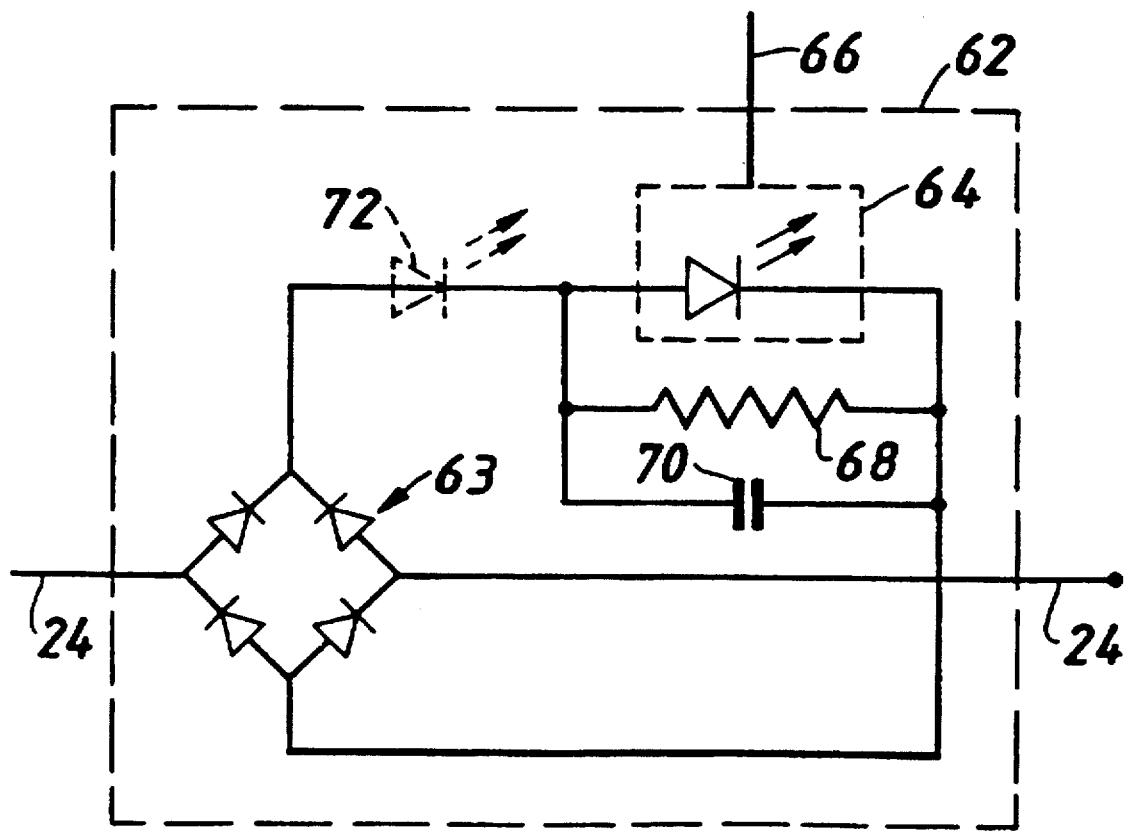
FIG. 3 is a diagrammatic representation of an ignition spark duration monitor used in the apparatus in FIG. 2.

With reference to FIGS. 2 and 3 an ignition spark duration monitor 62 is provided in one of the plug leads, in this example in the lead 24. The spark duration monitor 62 comprises a bridge rectifier 63 having opposite arms connected to the plug lead 24, and the bridge-rectifier being also connected to a circuit network comprising an optical transmitter 64 in series with the spark plug 16. When electrical ignition spark current flows in the lead 24 the optical transmitter 64 performs its transducer function and produces an optical signal transmitted along an optical fibre path 66 to the spark duration control 10, the duration of the optical signal being substantially equal to the duration of the spark. The bridge rectifier 63 allows for sparks of either polarity, and a parallel resistor 68 and capacitor 70 across the optical transmitter 64 are used to by-pass some of the spark current and high frequency spikes. The circuit network in the monitor 62 may also include a light emitting diode (LED) 72 to provide visual confirmation that spark current is present. In an alternative arrangement, the spark duration monitor may be mounted in the king lead 46 as exemplified by spark duration monitor $62^1$ shown in dotted lines.

Figure 4:
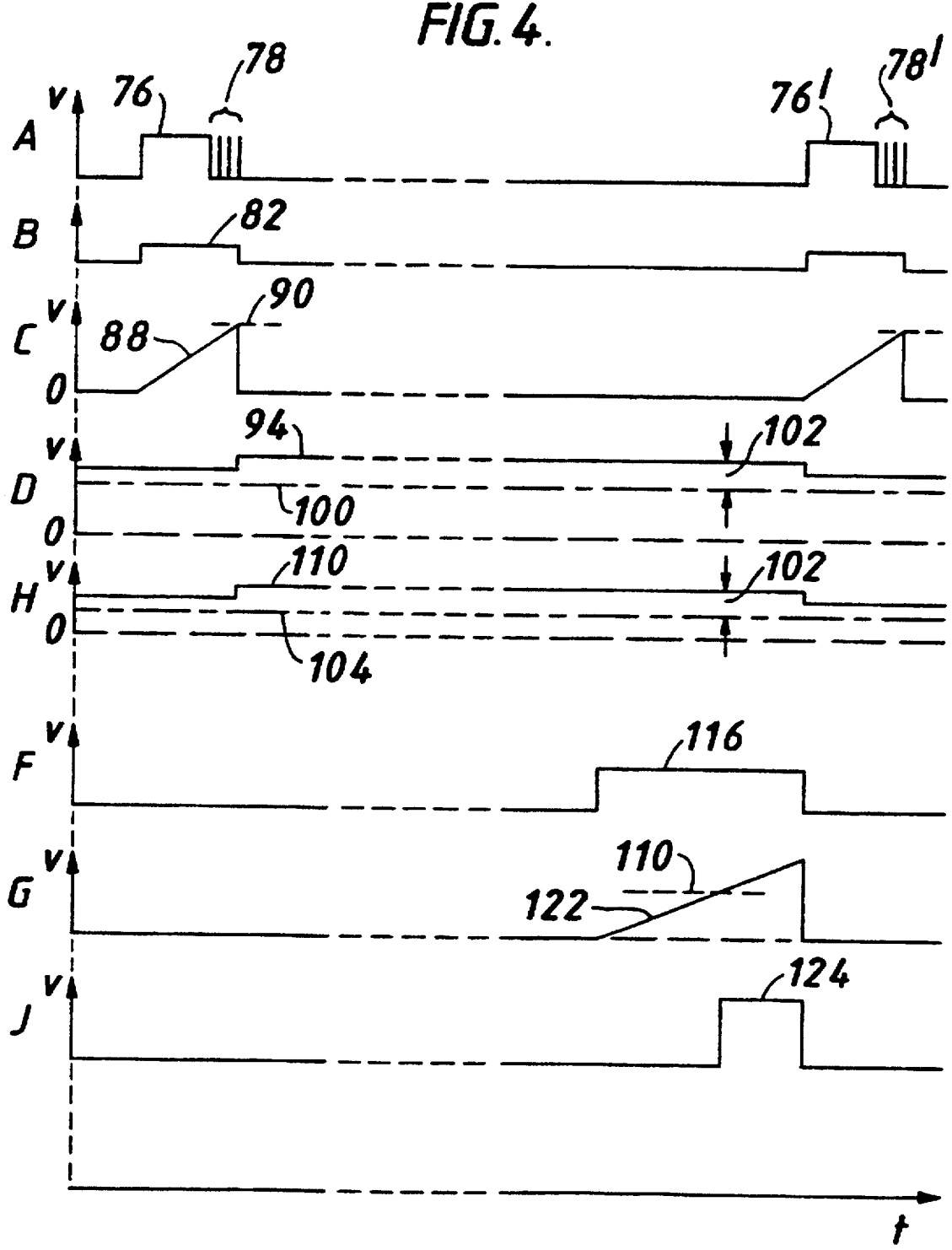
FIG. 4 is a set of graphs in which there is a common abscissa axis for time t, a plurality of ordinate axes for the voltages v of a plurality of different voltage signal outputs from respective component parts of the ignition spark duration control means in FIG. 2.

With reference to FIGS. 2 and 4, the optical signal on fibre optic path 66 is input to a spark upto receiver 74 in which the optical signal is converted to a corresponding electrical voltage signal output A representing the spark current and illustrated in FIG. 4A which is typically a block or square wave 76 followed by a burst of (current) spikes 78. The spikes form part of the total spark duration and occur because the optical transmitter 64 (FIG. 3) has a high threshold to avoid interference, and does not detect low current levels in plug lead 24 when the spark energy is decaying. The output signal A is input to spark duration conditioning circuit 80 giving a voltage output square wave signal B illustrated at 82 in FIG. 4B and lasting for substantially the duration of the spark (ie. a simulated reconstitution of the spark).

A constant current generator 84 inputs to a spark duration ramp circuit 86 which produces at C a voltage ramp output signal, represented at 88 in FIG. 4C, which cuts off at the cut-off of the square wave 82. A peak value, at 90, of the ramp signal 88 is detected by a peak detector circuit 92. The peak value 90 is a function of or proportional to the spark duration, and the peak detector circuit 92 gives an output D at a D.C. voltage level, represented by square wave 94 in FIG. 4D, which may be the same as the voltage level 90 but is in any case a function of or proportional to the spark duration. The signal 94 continues at the same D.C. level until it cuts off at the instant of commencement of the observation of the next spark duration signal $76^1$, $78^1$. The level of the signal 94 may be stored in the peak detector circuit 92 in a sample and hold integrated circuit chip using a capacitor to store the voltage level. The signal 94 is input to a spark duration error generator circuit 96 to which is input at E (FIG. 2) an output signal from a target spark duration signal generator 98 giving a signal at E (FIG. 2) (shown at 100 in FIG. D) which represents the predetermined, desired minimum spark duration. In the circuit 96 the signal 94 is compared with the minimum spark duration signal 100 to produce an error signal voltage 102 which is added to a predetermined constant offset voltage value 104 produced by an offset signal generator 106. The resultant voltage is input to a time constant circuit 108, for example a ten second time constant circuit, to give an output signal at H represented in FIG. 4H by a dwell modifier voltage signal 110. "Dwell" in this context means the time duration over which the primary winding 52 of the ignition coil is energised. Another input to the time constant circuit 108 is provided through a two-position switch 101 which in the position shown in FIG. 2 allows an input to the circuit 108 which allows the circuit to give the output signal 110 (FIG. 4H) at H; but in the other position the switch 101 causes disablement of the time constant circuit 108 which thus does not give an output at H and thus places the system 74, 80, 84, 86, 92, 96, 108 in disabled mode.

The time constant of the time constant circuit 108 produces an average error signal allowing a slow correction of spark duration with improved stability.

Continuing with reference to FIG. 2, the ignition spark duration control 10 includes an ignition dwell conditioning circuit 112 which may be original equipment (OE) provided by the engine manufacturer. The ignition dwell conditioning circuit 112 is triggered to give its electrical voltage signal output in response to signals from an engine crank shaft angle monitor 114. The monitor 114 observes rotation of the crank shaft and gives an output signal when the crank shaft is at each one in turn of a number of predetermined angles of rotation at each of which the spark generating procedure for the respective spark plug 16, 18, 20 or 22 should be commenced. That output from monitor 114 is input to the ignition dwell conditioning circuit 112 to trigger it to give a voltage output signal at F represented in FIG. 4F by the square wave ignition signal 116 of a constant, predetermined duration. A constant current generator 118 inputs to an OE voltage ramp generator 120 which produces an output G shown at 122 in FIG. 4G as a ramp voltage of constant slope, for the duration of the square wave 116. The ramp voltage signal 122 is input to a dwell comparator circuit 124 to which the dwell modifier signal 110 is also input. When the voltage ramp 122 reaches a voltage value equal to that of the dwell modifier signal 110 the dwell comparator gives a voltage output J represented in FIG. 4J by a square wave modified ignition signal 124 which goes low when the ignition signal 116 goes low. The modified ignition signal 124 is amplified by ignition amplifier 126 and the output of the amplifier 126 is input on line 62 to the base of the transistor switch 60 which switches on for the duration of the modified ignition signal 124 so that current flows in the primary winding 52 of the ignition coil 50 for that duration which determines the amount of magnetic energy stored in the primary winding. That amount of magnetic energy is enough so that when it decays when the transistor switch 60 is turned off at the cut-off of the modified ignition signal 124 (FIG. 4J) the voltage induced in the secondary winding 48 is enough to produce an ignition spark, at one of the spark plugs 16, 18, 20 or 22, of a duration which is substantially the predetermined minimum or is approaching said predetermined minimum.

In FIGS. 2 and 5 only the spark duration of the plug 16 is observed by the monitor 62, so the ignition spark duration of the plug 16 determines the magnetic energy stored in the primary winding 52 in the course of the firing procedures of the other three plugs 18, 20 and 22.

When the ignition spark duration varies from the said predetermined minimum duration represented by the voltage value of the minimum spark duration signal 100 (FIG. 4D) output from the target spark duration signal generator 98, it causes the error voltage 102 to vary which results in a variation of the duration of the modified ignition signal 124. In turn this causes variation in the amount of magnetic energy stored on the primary winding 52 to an amount which will result in the ignition spark, created as a consequence of the decay of that stored magnetic energy, having a duration which more closely approaches the predetermined minimum duration.

The offset voltage signal 104 has a constant voltage value which provides a safety factor by substantially ensuring that the dwell modifier voltage signal 110 (FIG. 4H) does not fall below to a value which can result in misfire.

In FIG. 6 the spark plugs 16, 18, 20 and 22 are fired in accordance with the wasted spark method. The crank angle monitor 114 inputs signals into an electronic selection means 128 which gives two outputs each fed into a respective spark duration and generating system 130A or 130B. The system 130A comprises an ignition spark duration control 10 as described above connected to an ignition coil powering system 54 in which there is no distributor 40 (FIG. 2) and instead opposite ends of the secondary winding 48 are respectively connected to the plug leads 24 and 26; and the monitor 62 is in the lead 24. When the secondary coil 48 in the system 134A is energised both plugs 16 and 18 fire simultaneously.

Likewise the system 130B comprises an ignition spark control 10 as previously described connected to an ignition powering system 54 as in the system 130A but this time opposite ends of the secondary winding are respectively connected to the plug leads 28 and 30 which latter includes the monitor 62. In each system 130A and 130B the ignition spark duration control 10 therein operates in like manner to the control in FIG. 2 described above. But in this case the system 130A controls the duration of the ignition sparks at the spark plugs 16 and 18 and the system 130B controls the duration of the sparks at the plugs 20 and 22. The crank shaft angle monitor 114 observes rotation of the crank shaft through the various angular positions (known per se) at each of which the spark generation procedure for either one or the other set of plugs 16, 18 or 20, 22 should be commenced and the selection means 128 in response automatically selects to which system 130A or 130B it sends an output signal to trigger the ignition dwell conditioning circuit 112 in the selected system 130A or 130B. Although two ignition switches 58 and batteries 56 are shown, a single ignition switch and battery are preferably common to both systems 130A and 130B. Also it will be understood that the minimum electrical ignition energy supplied by either secondary winding 48 to fire either pair of spark plugs 16, 18 or 20, 22 is that required to fire two spark plugs.

In FIG. 7 each spark plug 16, 18, 20 or 22 is connected to a respective spark duration and generating system 130C, 130D, 130E or 130F so that the secondary winding 42 in any of those systems can only fire one particular spark plug. The crank angle monitor observes rotation of the crank shaft through various angular positions (known per se) at each of which the spark generating procedure for a respective spark plug 16, 18, 20 or 22 should be commenced and the electronic selection means 128 in response automatically selects which system 130C, 130D, 130E or 130F it sends an output signal to to trigger the ignition dwell conditioning circuit 112 in the selected system 130c, 130D, 130E or 130F. Although four ignition switches 58 and four batteries 56 are shown, a single ignition switch and a single battery are common to the four systems 130C, 130D, 130E and 130F.

I claim:

1. A reciprocating internal combustion engine comprising:
   at least one cylinder provided with a spark plug having at least two electrodes with a gap therebetween;
   ignition spark duration control means whereby the duration of an ignition spark between said electrodes is automatically variable to bring said spark duration closer to a predetermined minimum duration during which predetermined minimum duration there is supplied to the electrodes a minimum level of electrical ignition energy to substantially avoid misfire in the cylinder, and wherein said minimum level is variable according to the size of said gap; and
   duration observing means comprising optical signal generating means, said duration observing means determining the duration of a phenomenon which is a function of said predetermined duration of said spark and producing an optical signal which is a duration representative signal which is a function of said duration of said phenomena, and wherein said ignition spark duration control means receives said duration representative signal.

2. An internal combustion engine according to claim 1, arranged to operate at a substantially constant load.

3. An internal combustion engine according to claim 1, wherein said duration observing means determines the duration of spark producing electrical energy discharged from a secondary winding of an ignition coil.

4. An internal combustion engine according to claim 3, in which said duration observing means determine the duration of spark producing electrical energy in an electrical plug lead connected to said spark plug.

5. An internal combustion engine according to claim 1, wherein there is a plurality of said cylinders each with a respective said spark plug.

6. An internal combustion engine according to claim 5, wherein each said spark plug is connected to a respective said plug lead, said duration observing means is arranged to observe the duration of spark producing energy in one of said plug leads, and said ignition spark duration control means being common to the said spark plugs whereby a given amount of electrical energy constituting said minimum level is supplied to each of said spark plugs in turn.

7. An internal combustion engine according to claim 4, in which there are two said cylinders each provided with a respective said spark plug, each plug is connected to a respective said plug lead, both plug leads are connected to the secondary winding which is arranged to fire the two spark plugs simultaneously, and said ignition spark duration control means is arranged to control the duration of the ignition spark at each of the said spark plugs and utilize the duration representative signal produced by the duration observing means observing the duration of the electrical spark producing energy supplied to the spark plugs.

8. An internal combustion engine according to claim 4, in which there is a plurality of said cylinders each with a respective said spark plug each connected by a respective said plug lead to a said secondary winding of a respective said ignition coil, each ignition coil is arranged for operation in response to signals provided by a respective said ignition spark duration control means, each ignition spark duration control means is connected to a respective said duration observing means, and each duration observing means is arranged to observe the duration of spark producing electrical energy in a respective said plug lead.

9. An internal combustion engine according to claim 3, in which the duration representative signal is utilized in said ignition spark duration control means to produce an error signal when the duration representative signal differs from said predetermined minimum duration, and a control signal which is a function of said error signal is compared with a dwell signal which would initiate provision of a substantially fixed supply of said electrical ignition energy, and should said error signal vary from said dwell signal then an ignition control signal is produced to cause the electrical ignition energy to be varied to a value which results in the duration of the ignition spark approaching nearer to or being substantially equal to said predetermined minimum duration.

10. An internal combustion engine according to claim 1, in which the optical signal generating means is included in a high tension lead from the ignition coil.

11. An internal combustion engine according to claim 1, in which said duration observing means determines the duration of spark producing electrical energy in an electrical plug lead connected to said spark plug.

12. An internal combustion engine according to claim 2, in which said duration observing means determines the duration of spark producing electrical energy in an electrical plug lead connected to said spark plug.

13. An internal combustion engine according to claim 4, in which the duration representative signal is utilized in said ignition spark duration control means to produce an error signal when the duration representative signal differs from said predetermined minimum duration, and a control signal which is a function of said error signal is compared with a dwell signal which would initiate provision of a substantially fixed supply of said electrical ignition energy, and should said error signal vary from said dwell signal then an ignition control signal is produced to cause the electrical ignition energy to be varied to a value which results in the duration of the ignition spark approaching nearer to or being substantially equal to said predetermined minimum duration.

14. An internal combustion engine according to claim 5, in which the duration representative signal is utilized in said ignition spark duration control means to produce an error signal when the duration representative signal differs from said predetermined minimum duration, and a control signal which is a function of said error signal is compared with a dwell signal which would initiate provision of a substantially fixed supply of said electrical ignition energy, and should said error signal vary from said dwell signal then an ignition control signal is produced to cause the electrical ignition energy to be varied to a value which results in the duration of the ignition spark approaching nearer to or being substantially equal to said predetermined minimum duration.

15. An internal combustion engine according to claim 6, in which the duration representative signal is utilized in said ignition spark duration control means to produce an error signal when the duration representative signal differs from said predetermined minimum duration, and a control signal which is a function of said error signal is compared with a dwell signal which would initiate provision of a substantially fixed supply of said electrical ignition energy, and should said error signal vary from said dwell signal then an ignition control signal is produced to cause the electrical ignition energy to be varied to a value which results in the duration of the ignition spark approaching nearer to or being substantially equal to said predetermined minimum duration.

16. An internal combustion engine according to claim 7, in which the duration representative signal is utilized in said ignition spark duration control means to produce an error signal when the duration representative signal differs from said predetermined minimum duration, and a control signal which is a function of said error signal is compared with a dwell signal which would initiate provision of a substantially fixed supply of said electrical ignition energy, and should said error signal vary from said dwell signal then an ignition control signal is produced to cause the electrical ignition energy to be varied to a value which results in the duration of the ignition spark approaching nearer to or being substantially equal to said predetermined minimum duration.

17. An internal combustion engine according to claim 8, in which the duration representative signal is utilized in said ignition spark duration control means to produce an error signal when the duration representative signal differs from said predetermined minimum duration, and a control signal which is a function of said error signal is compared with a dwell signal which would initiate provision of a substantially fixed supply of said electrical ignition energy, and should said error signal vary from said dwell signal then an ignition control signal is produced to cause the electrical ignition energy to be varied to a value which results in the duration of the ignition spark approaching nearer to or being substantially equal to said predetermined minimum duration.

18. Combined heat and power apparatus comprising a reciprocating internal combustion engine comprising:
- at least one cylinder provided with a spark plug having at least two electrodes with a gap therebetween;
- ignition spark duration control means whereby the duration of an ignition spark between said electrodes is automatically variable to bring said spark duration closer to a predetermined minimum duration during which predetermined minimum duration there is supplied to the electrodes a minimum level of electrical ignition energy to substantially avoid misfire in the cylinder, and wherein said minimum level is variable according to the size of said gap; and
- duration observing means comprising optical signal generating means, said duration observing means determining the duration of a phenomenon which is a function of said predetermined duration of said spark and producing an optical signal which is a duration representative signal which is a function of said duration of said phenomena, and wherein said ignition spark duration control means receives said duration representative signal.

* * * * *